(12) United States Patent
Farr et al.

(10) Patent No.: US 7,046,957 B1
(45) Date of Patent: May 16, 2006

(54) REFLECTING MODULATOR CIRCUIT COMPRISING A NEGATIVE IMPEDANCE AMPLIFIER

(76) Inventors: Adrian N Farr, The Mill House, Bran End, Stebbing, Dunmow, Essex, CM6 3RS (GB); Ian J Forster, 31 Great Cob, Springfield, Chelmsford, Essex, CM1 6LA (GB)

( * ) Notice: Subject to any disclaimer, the term of this patent is extended or adjusted under 35 U.S.C. 154(b) by 326 days.

(21) Appl. No.: 10/019,140

(22) PCT Filed: Jun. 7, 2000

(86) PCT No.: PCT/GB00/02200

§ 371 (c)(1),
(2), (4) Date: May 6, 2002

(87) PCT Pub. No.: WO01/01649

PCT Pub. Date: Jan. 4, 2001

(30) Foreign Application Priority Data

Jun. 25, 1999 (GB) .................................. 9914941

(51) Int. Cl.
*H04B 7/15* (2006.01)

(52) U.S. Cl. ...................... 455/11.1; 455/41.2; 342/44; 375/222; 375/279; 375/312; 375/315

(58) Field of Classification Search ................ 455/106, 455/41.2, 42, 59, 47, 109, 11.1; 340/10.1; 375/308, 302, 333, 279, 222, 315, 312; 342/42, 342/50, 44
See application file for complete search history.

(56) References Cited

U.S. PATENT DOCUMENTS

| | | | | |
|---|---|---|---|---|
| 4,075,632 A | * | 2/1978 | Baldwin et al. | 342/51 |
| 5,164,719 A | * | 11/1992 | Guena et al. | 340/10.34 |
| 5,173,705 A | * | 12/1992 | Camiade et al. | 342/42 |
| 5,305,469 A | * | 4/1994 | Camiade et al. | 455/78 |
| 5,311,186 A | * | 5/1994 | Utsu et al. | 342/51 |
| 5,649,295 A | * | 7/1997 | Shober et al. | 340/10.1 |
| 5,822,685 A | | 10/1998 | Forster | |
| 6,046,668 A | * | 4/2000 | Forster | 340/10.4 |

FOREIGN PATENT DOCUMENTS

| | | |
|---|---|---|
| DE | 1 912 852 | 10/1970 |
| EP | 0 288 035 | 4/1988 |
| EP | 0 324 564 | 1/1989 |
| GB | 2 284 323 A | 5/1995 |
| JP | 57-111158 | 7/1982 |
| JP | 61-257050 | 11/1986 |
| JP | 63-198452 | 8/1988 |
| JP | 6-104945 | 4/1994 |

* cited by examiner

*Primary Examiner*—Edward F. Urban
*Assistant Examiner*—Blane J. Jackson
(74) *Attorney, Agent, or Firm*—Christensen O'Connor Johnson Kindness PLLC

(57) ABSTRACT

A modulator circuit comprises a negative impedance amplifier which is operable such that a signal applied to the amplifier is reflected and amplified. Switching circuitry is provided for switching the impedance of the amplifier between two reflecting states such that the reflected and amplified signal is phase modulated. The impedances of the negative impedance amplifier are selected such that the phase of the reflected and amplified signal switches by substantially 180°. Preferably, the impedances of the negative impedance amplifier in the two reflecting states are selected such that the reflection gain of the amplifier in the two reflecting states is substantially the same such that the reflected and amplified signal is a binary phase shift keyed.

22 Claims, 3 Drawing Sheets

REFLECTING MODULATOR CIRCUIT COMPRISING A NEGATIVE IMPEDANCE AMPLIFIER

This invention relates to a modulator circuit and more especially to such a circuit for generating binary phase shift key modulation.

Modulation, which can be broadly defined as a time varying modification of a signal to impart information thereto, is a crucial feature of the design of almost all radio based systems. An effective and well known form of modulation for digital signals, is binary phase shift keying (BPSK). In BPSK one of the two digital states of information is imparted onto a carrier signal by modulating its phase to have two discrete values which are generally separated by 180 degrees ($\pi$ radians). Whilst such a modulation technique may be efficient it has not previously been ideally suited for applications where low cost and low power consumption are paramount such as in tagging systems, since the known circuitry for generating BPSK is complex and consumes too much electrical power for operation from a finite battery supply.

The present invention has arisen in an endeavour to provide a modulator circuit which at least in part overcomes the limitations of the known modulators and which is suitable for use in a tagging systems or other applications where low power consumption and circuit simplicity are of importance.

According to the present invention a modulator circuit comprises: a negative impedance amplifier operable such that a signal applied to the amplifier is reflected and amplified and switching means for switching the impedance of the amplifier between two reflecting states, characterised in that the impedances in the two reflecting states are selected such that the phase of the reflected and amplified signal switches by substantially 180 degrees.

Preferably the impedances in the two reflecting states are selected such that the reflection gain of the amplifier in the two reflecting states is substantially the same such that the reflected and amplified signal is a binary phase shift keyed.

Alternatively the impedances in the two reflecting states are selected such that the reflection gain of the amplifier in the two reflecting states is different and wherein said impedances are selected such the reflected and amplified signal is a substantially single sideband signal.

In a particularly preferred embodiment the negative impedance amplifier comprises a transistor, such as for example a bipolar or field effect transistor, and biasing means for biasing the transistor such as to act as a negative impedance amplifier. Such a modulator circuit is found to be particularly advantageous since it in essence can comprise only a single component. Furthermore, a negative impedance amplifier is capable of providing high gain at very low current, so its power consumption can accordingly be very low of the order of a few micro-amps. Conveniently when using a transistor the switching means switches the biasing of the transistor to switch the transistor between the two reflecting states.

Advantageously the modulator circuit further comprises an antenna for receiving radiation and converting it to the signal applied to the amplifier and for radiating the reflected and amplified signal.

According to a second aspect of the invention there is provided a demodulator circuit for demodulating a Binary phase shift keyed signal which incorporates the modulator circuit described above.

According to a third aspect of the invention there is provided a transponder tag which incorporates the modulator circuit described above.

A modulator circuit in accordance with the invention will now be described by way of example only with reference to the accompanying drawings in which.

Figure 1:
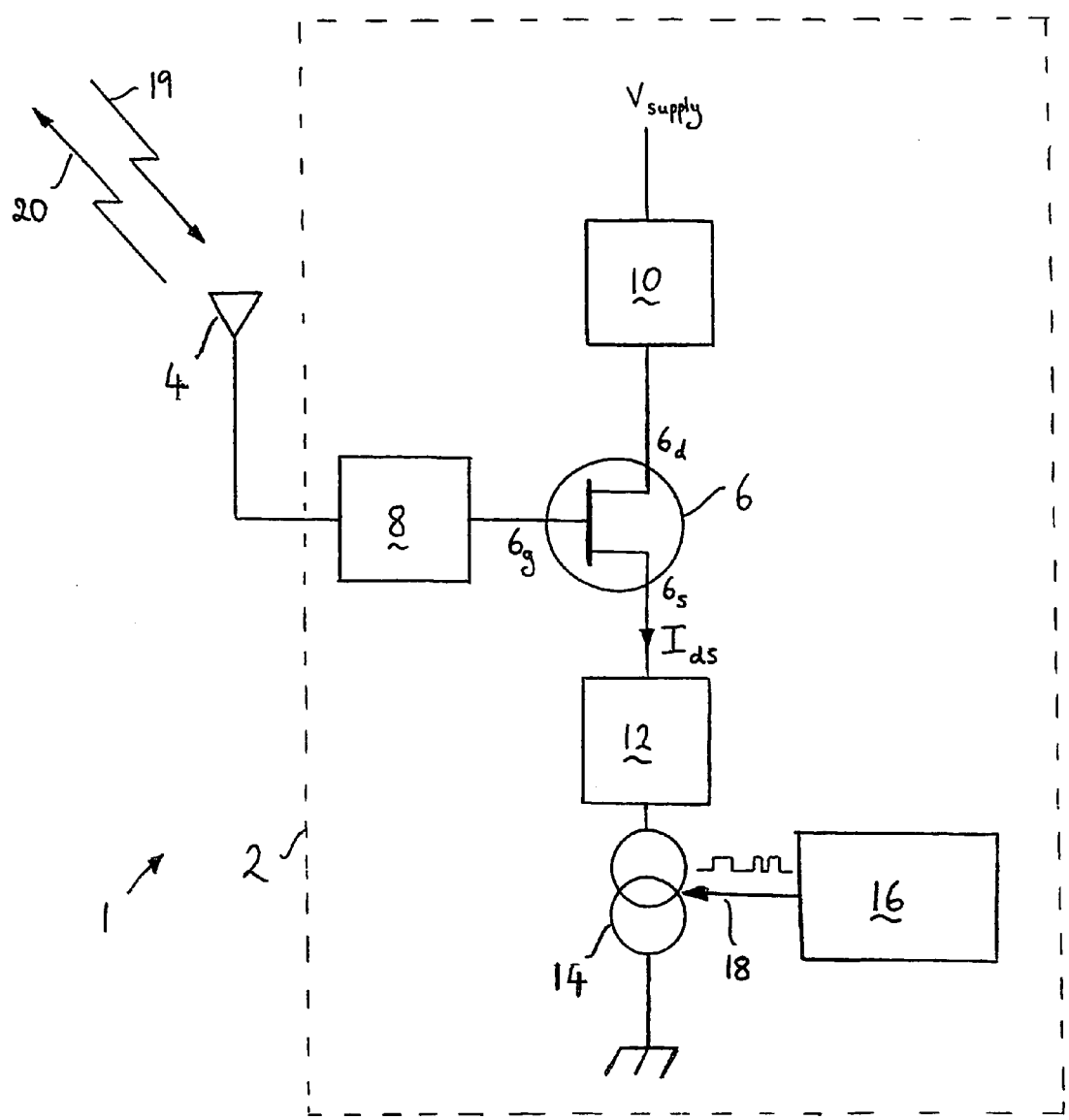
FIG. 1 is a schematic representation of a transponder circuit which incorporates a modulator circuit in accordance with the invention.

Referring to FIG. 1 there is shown a microwave frequency (2.45 GHz) pseudo passive transponder tag 1 for use in a tagging system which incorporates a modulator circuit 2 in accordance with the invention. The tag 1 comprises an antenna 4 which is connected to the modulator circuit 2. The modulator circuit 2 comprises: a gallium arsenide (GaAs) field effect transistor (FET) 6, impedance matching/feedback networks 8, 10, 12 connected to a respective transistor terminal, a switchable current source 14 and a control circuit 16. The antenna 4, which for operation at microwave frequencies conveniently comprises a patch antenna, is connected to the gate electrode $6_g$ of the FET 6 via the matching network 8 which conveniently comprises a transmission line element. The drain electrode $6_d$ of the FET 6 is connected to a positive supply $V_{supply}$ by the matching network 10. The source electrode $6_s$ connected to ground via the matching network 12 and the switchable current source 14. The current source 14 is controlled by the control circuit 16 via a control line 18.

In a known manner the FET 6 is biased by a biasing network which comprises the matching/feedback networks 8, 10, 12 such that it operates in a linear relatively high gain region of its current/voltage characteristic. Conveniently each of the networks 8, 10, 12 comprises a transmission line element. The FET 6 thus amplifies and reflects any signal appearing at its gate electrode $6_g$ and therefore acts as a negative impedance amplifier. This being said, it will be appreciated that in most applications the impedance of the amplifier is primarily resistive.

The magnitude of the negative impedance of the modulator circuit 2 is dependent on the drain/source current $I_{ds}$ passing through the transistor 6, and this current is determined by the switchable current source 14. The current source 14 is switchable between two selected currents $I_{ds1}$ and $I_{ds2}$ in dependence upon control circuit 16. For both currents $I_{ds1}$ and $I_{dS2}$, the FET 6 operates as a negative impedance amplifier, though for each current the magnitude of its negative impedance is different.

In operation of the circuit 1 the antenna 4 receives and converts microwave radiation 19 into an electrical signal which is applied via the matching network 8 to the gate $6_g$ of the FET 6. As described above the FET 6 acts as a negative impedance amplifier and the electrical signal is reflected and amplified by the FET 6 and re-radiated as microwave radiation 20 from the antenna 4. In the case of tagging systems the microwave radiation 19 is an interrogating radiation signal which can be a continuous wave or modulated wave signal. To impart information to the radiation 20 the control circuit 16 switches between the two currents $I_{ds1}$ and $I_{ds2}$ such that the phase of the radiation 20 switches by 180 degrees. An important feature of the invention is the selection of the magnitude of the negative impedance of the circuit 2 for the two currents $I_{ds1}$ and $I_{ds2}$. These are selected such that (i) the circuit has the same reflection gain for each current and (ii) the phase between the reflected and amplified signal for the two currents is switched by 180 degrees. The reflection gain (in decibels dB) of the circuit 1 as seen looking toward the gate terminal $6_g$ is given by:

$$\text{gain} = 20 \log \left| \frac{Zn - Zo}{Zn + Zo} \right|$$

where Zo is the antenna impedance (or in the case where no antenna is present, it is the system impedance) and Zn is the input impedance presented by the FET 6 (that is the negative impedance looking towards the gate $6_g$). For the embodiment shown in FIG. 1 the system/antenna impedance is nominally 50 ohms and the value of the negative impedance is switchable between −45 and −55.555 ohms for $I_{ds1}$ and $I_{ds2}$ respectively to give a reflection gain in each case of 25 dB. It is to be noted that for these impedance values whilst the reflection gain is constant, the phase of the reflected and amplified signals will be altered by 180 degrees. This change of phase is indicated by the change of the sign of the term (Zn−Zo)÷(Zn+Zo). Thus for the example of FIG. 1 $I_{ds1}$ is selected such that the FET 6 operates as a negative impedance of −45 ohms and $I_{ds2}$ is selected such that the FET 6 operates as negative impedance of −55.555 ohms. It will be appreciated therefore that the circuit 2 acts as a binary phase shift key reflective modulator. A particular advantage of the modulator circuit 2 is that it provides a simple method of generating BPSK and offers the additional benefit that it also amplifies the signal which it is modulating. Due to the circuit's simplicity it is ideally suited to tagging applications where it further has the advantage that it is capable of operating at very low currents (of the order of a few micro-amps) for an operating frequency of 2.4 GHz.

With different values for the respective impedances, both the magnitude and phase of the reflected signal can be varied between the two states, such that a combination of amplitude modulation (AM) and phase modulation (PM) can be applied. With an appropriate combination of the two forms of modulation the radiated signal 20 can be arranged to be a substantially single sideband signal.

Figure 2:
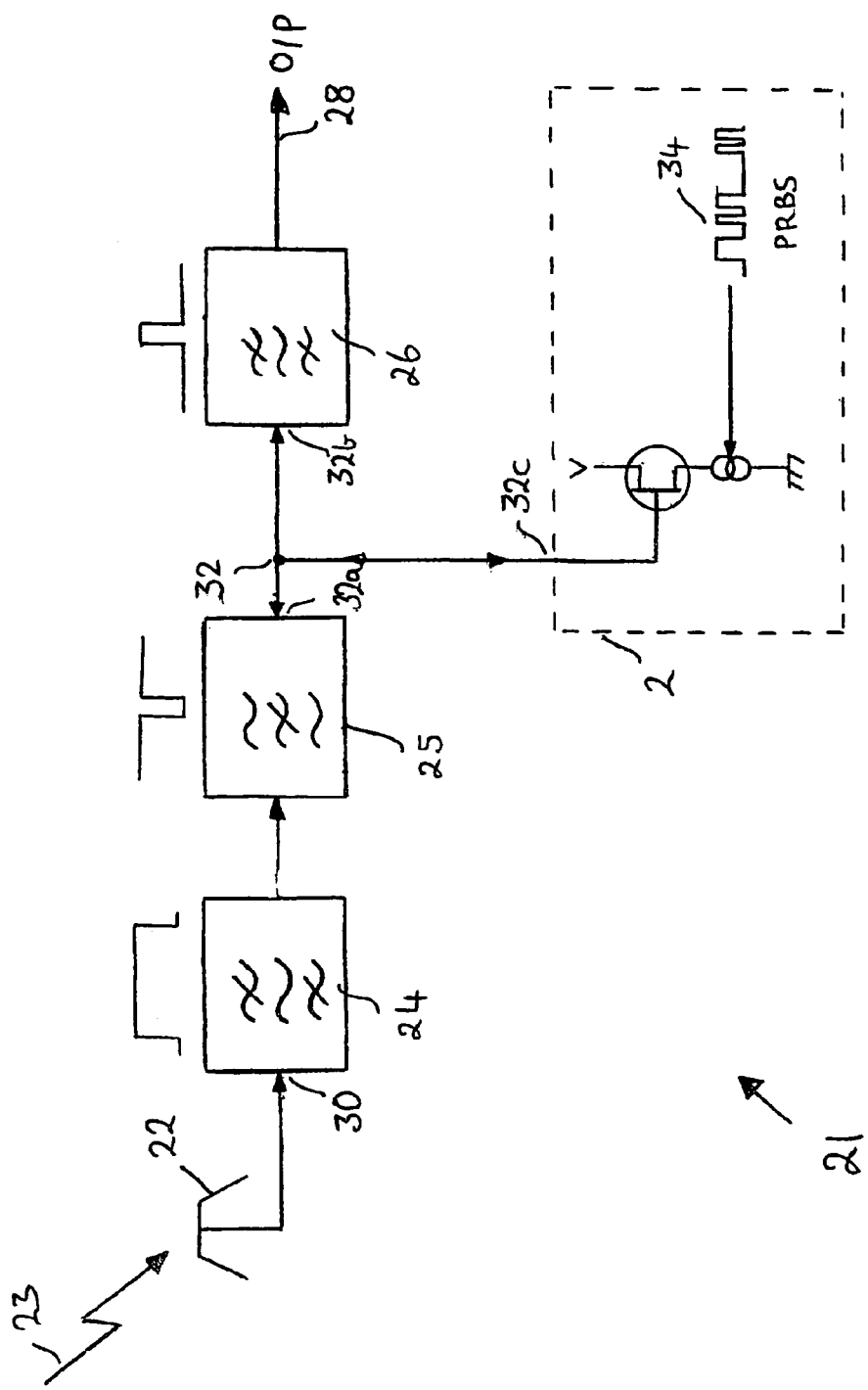
FIG. 2 is a schematic representation of a de-spreader circuit for use in a spread spectrum communication system which incorporates the modulator circuit of FIG. 1.

Referring to FIG. 2 there is shown a schematic of a de-spreader circuit 21 for use in a spread spectrum communication system such as for example of the type used in a global positioning system. As is known in such spread spectrum systems a carrier signal is modulated with a digital code, most often a pseudo random binary sequence (PRBS), to spread its energy spectra. Commonly the modulation used is BPSK. The circuit 21 is intended for de-spreading such spread spectrum radiation to recover the original carrier signal and any modulation applied thereto. This is achieved by using the modulator 2 of FIG. 1 to apply a replica of the sequence used to generate the spread spectrum. It will be appreciated that the sequence applied by the circuit 21 is additionally in time synchronisation with the generating sequence.

The circuit 21 comprises; an antenna 22 for receiving broad band spread spectrum radiation 23, a broad pass-band filter 24, a narrow stop-band filter 25, a narrow pass-band filter 26 and a modulator circuit 2. The broad pass-band filter 24, narrow stop-band filter 25 and narrow pass-band filter 26 are connected in series and the output 28 of the narrow pass-band filter 26 provides the output 28 of the circuit 21. The antenna 22 is connected to the input 30 of the broad band filter 24. The modulator circuit 2, which is identical to the circuit shown in FIG. 1, is connected to the interconnection 32 of the filters 25 and 26.

The reflective modulator circuit 2 has a gain of 20 dB in both reflecting states. The reflecting state of the modulator 2 is controlled by a digital signal 34, which as described above is a replica of the original sequence signal used to generate the broad band signal 23. Most typically the signal 34 is a PRBS signal.

In operation the broad band spread radiation 23 is received and converted to an electrical signal by the antenna 22 and passes through the broad pass-band filter 24 and narrow stop-band filter 25. The pass-band of the filter 24 defines the bandwidth of operation of the circuit 21. The centre frequency of the stop-band filter 25 is selected to correspond with the carrier frequency of the radiation 23 to block any components at the carrier frequency. The filtered signal appearing at the output 32a of the filter 25 is applied to both the input 32b of the narrow pass-band filter 26 and to the input 32c of the modulator 2. Due to the pass-band pass characteristic of the narrow band-pass filter 26 the filtered signal is blocked by the filter 26. The filtered signal however appearing at the input 32c of the modulator circuit 2 is de-modulated to produce an amplified version of the original carrier signal which is reflected back to the interconnection 32. The amplified carrier signal, which is within the band pass characteristic of the narrow pass-band filter 26, passes through substantially unattenuated to the output 28. The demodulated signal is prevented from returning to the antenna 22 by the stop-band filter 25. The circuit 20 thus operates as a de-spreader circuit and is capable of operating at substantially lower currents than those which currently use digital techniques.

A further example of an application of the reflector modulator in accordance with the invention is now described with reference to FIG. 3 which is a schematic of a spread spectrum communication system 40 for use in covert communications between a transmitter 42 and a hand held radio receiver 44. As is known spreading the spectra of the transmitted signal, and hence spreading the energy over a large frequency range, makes it more difficult for the signal to be detected by unauthorised persons and hence for such persons to determine the position of the transmitting source.

Figure 3:
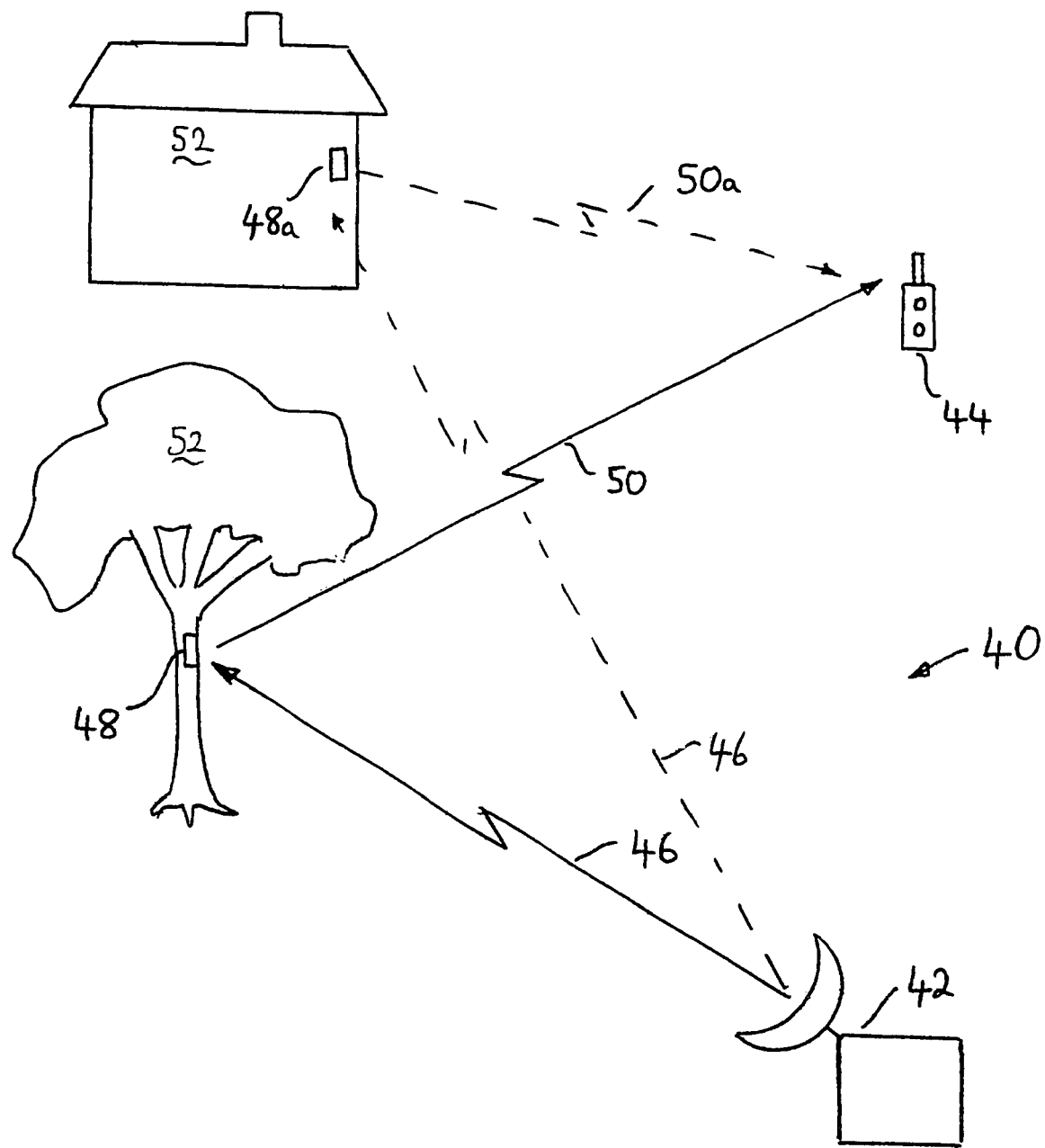
FIG. 3 is a schematic representation of a spread spectrum communication system incorporating the modulator circuit of FIG. 1.

Referring to FIG. 3 the communication system 40 comprises: a spread spectrum transmitter 42 of a known type which generates a BPSK modulated broad band spread spectrum radiation 46, a reflective de-spreading circuit 48 and a hand held radio receiver 44. The de-spreader circuit 48 is identical to the transponder circuit 1 of FIG. 1 in which the control circuit 16 switches the transistor 6 using an identical code to that used by the transmitter 42 to generate the spread signal 46. The de-spreader circuit 48 thus receives the broad band radiation 46 and in response radiates an amplified and de-spread narrow band radiation 50 which represents the recovered carrier of the signal 46 and any modulation applied thereto. The narrow band radiation 50 is detected by the hand held radio receiver 44. The de-spreading circuit 48 is preferably mounted at a high point such as on the side of a building 52 or other structure such as a post or a tree. Since the radiation 46 generated by the transmitter 42 is broad band this makes it difficult for a direction finding receiver to locate the position of the transmitter 42. Although such a direction finding receiver may be able to locate the narrow band radiated emissions 50 from the de-spreading circuit 48 and hence determine its position, it will still be unable to determine the position of the transmitter 42. In a preferred communication system a number of de-spreading circuits 48 (a second such circuit 48a is shown in FIG. 3), each having a different modulation code, are located at different physical locations. The transmitter 42 is operable to switch between the different modulating codes during communication with the hand held radio 44 such that different de-spreading circuits 48 become activated. As a result the position from which the narrow band radiation 50, 50a originates will jump from de-spreading circuit 48 to de-spreading circuit 48a, thereby hampering any attempt to locate the position of the de-spreading circuit.

It will be appreciated that modifications can be made to the circuits described which are still within the scope of the invention. For example whilst in the examples described the modulator circuit uses a field effect transistor, which is much preferred for operation of microwave frequencies, the negative impedance amplifier can be implemented in different ways, depending upon the required frequency of operation, such as for example using a bi-polar transistor or other active devices. Furthermore the modulator circuit of the invention is not restricted to the applications described and is suited for use in any application which requires BPSK modulation. The present invention resides in the realisation that binary phase shift key modulation can be achieved by using a reflection amplifier and switching the circuit between two reflecting states which preferably have the same reflection gain (though this is not essential when single sideband operation is required), but which change the phase of the reflected signal by substantially 180 degrees.

The invention claimed is:

1. A modulator circuit, comprising:
a negative impedance amplifier operable for reflecting and amplifying a signal applied to the amplifier; and
switching means for switching the amplifier between two reflecting states having impedances in the two reflecting states selected such that a phase of a reflected and amplified signal switches by substantially 180°.

2. The modulator circuit according to claim 1, in which the impedances in the two reflecting states are selected such that a reflection gain of the amplifier in the two reflecting states is substantially the same and such that the reflected and amplified signal is a binary phase shift keyed signal.

3. The modulator circuit according to claim 1, in which the impedances in the two reflecting states are selected such that a reflection gain of the amplifier in the two reflecting states is different, and wherein the impedances are selected such the reflected and amplified signal is a substantially single sideband signal.

4. The modulator circuit according to claim 1, in which the negative impedance amplifier comprises a transistor and a biasing means for biasing the transistor such as to act as the negative impedance amplifier.

5. The modulator circuit according to claim 4, in which the switching means switches the biasing of the transistor to switch the transistor between the two reflecting states.

6. The modulator circuit according to claim 1, further comprising an antenna for receiving and converting radiation to the signal applied to the amplifier, and for radiating the reflected and amplified signal.

7. The modulator circuit according to claim 4, in which the transistor comprises a bipolar transistor.

8. The modulator circuit according to claim 4, in which the transistor comprises a field effect transistor.

9. A de-modulator circuit for de-modulating a binary phase shift keyed signal, comprising:
a modulator circuit including a negative impedance amplifier operable for reflecting and amplifying a signal applied to the amplifier; and
switching means for switching the amplifier between two reflecting states having impedances in the two reflecting states selected such that a phase of a reflected and amplified signal switches by substantially 180°.

10. A transponder tag, comprising:
a modulator circuit including a negative impedance amplifier operable for reflecting and amplifying a signal applied to the amplifier; and
switching means for switching the amplifier between two reflecting states having impedances in the two reflecting states selected such that a phase of a reflected and amplified signal switches by substantially 180°.

11. A transponder tag, comprising:
a negative impedance amplifier configured to reflect a received signal; and
a switchable biasing circuit configured to bias the amplifier in a first state wherein the amplifier reflects a first signal having a first phase, the biasing circuit further configured to bias the amplifier in a second state wherein the amplifier reflects a second signal having a second phase that differs substantially from the first phase.

12. The transponder tag according to claim 11, wherein the negative impedance amplifier includes a transistor that is biased by the switchable biasing circuit.

13. The transponder tag according to claim 12, wherein the switchable biasing circuit is configured to modify a current passing through the transistor.

14. The transponder tag according to claim 13, wherein the switchable biasing circuit is configured to switch the current passing through the transistor between two different currents.

15. The transponder tag according to claim 14, wherein the two different currents are selected based on a desired phase difference of the first and second signals.

16. The transponder tag according to claim 14, wherein the two different currents are selected based on a desired phase of the first and second signals.

17. The transponder tag according to claim 13, wherein the switchable biasing circuit includes a current source.

18. The transponder tag according to claim 11, further comprising a control circuit configured to output a control signal that causes the switchable biasing circuit to switch the amplifier between the first and second states.

19. A method, comprising:
providing a negative impedance amplifier configured to reflect a received signal;
biasing the amplifier to operate in a first state wherein the amplifier reflects a first signal having a first phase; and
switching the biasing of the amplifier to operate in a second state wherein the amplifier reflects a second signal having a second phase that differs substantially from the first phase.

20. The method according to claim 19, wherein biasing of the amplifier includes modifying a current passing through the amplifier.

21. The method according to claim 20, wherein the current passing through the amplifier is modified based on a desired phase difference of the first and second signals.

22. The method according to claim 20, wherein the current passing through the amplifier is modified based on a desired phase of the first and second signals.

* * * * *

UNITED STATES PATENT AND TRADEMARK OFFICE
CERTIFICATE OF CORRECTION

PATENT NO. : 7,046,957 B1
APPLICATION NO. : 10/019140
DATED : May 16, 2006
INVENTOR(S) : A.N. Farr et al.

It is certified that error appears in the above-identified patent and that said Letters Patent is hereby corrected as shown below:

On The Title Page, Item (76) Inventors "Adrian N Farr," should read --Adrian N. Farr,--

On The Title Page, Item (76) Inventors "Ian J Forster," should read --Ian J. Forster,--

On The Title Page, Item (57) Abstract line 13 "shift keyed." should read --shift keyed signal.--

Column 1 Line 12 "signals, is" should read --signals is--

Column 1 Line 26 "a tagging systems" should read --tagging systems--

Column 1 Line 41 "shift keyed." should read --shift keyed signal.--

Column 1 Line 44 "such the" should read --such that the--

Column 1 Line 56 "low of" should read --low, of--

Column 1 Line 65 "Binary" should read --binary--

Column 2 Line 31 "$\mathbf{6}_S$ connected" should read --$\mathbf{6}_S$ is connected--

Column 2 Line 51 "$\mathbf{I}_{dS2}$," should read --$\mathrm{I}_{ds2}$,--

Column 3 Line 31 "as negative" should read --as a negative--

Column 3 Line 63 "comprises;" should read --comprises--

Column 4 Line 64 "band this makes it" should read --band, it is--

UNITED STATES PATENT AND TRADEMARK OFFICE
CERTIFICATE OF CORRECTION

PATENT NO. : 7,046,957 B1
APPLICATION NO. : 10/019140
DATED : May 16, 2006
INVENTOR(S) : A.N. Farr et al.

It is certified that error appears in the above-identified patent and that said Letters Patent is hereby corrected as shown below:

Column 5 Line 49 "such the" should read --such that the-- (Claim 3, line 5)

Signed and Sealed this

Thirteenth Day of November, 2007

JON W. DUDAS
*Director of the United States Patent and Trademark Office*